United States Patent [19]
Peterson

[11] Patent Number: 5,862,463
[45] Date of Patent: Jan. 19, 1999

[54] SHORTWAVE BROADCAST CONVERTER

[76] Inventor: William Peterson, 1223A Balboa Ct., Norcrosse, Ga. 30093

[21] Appl. No.: 787,644

[22] Filed: Jan. 23, 1997

[51] Int. Cl.[6] ...................................................... H04B 1/16
[52] U.S. Cl. .......................... 455/142; 455/260; 455/313; 455/131
[58] Field of Search .................................. 455/142–144, 455/193.1, 260, 313, 205, 131; 375/316, 376, 216

[56] References Cited

U.S. PATENT DOCUMENTS

| | | | |
|---|---|---|---|
| 3,360,730 | 12/1967 | Sims | 455/142 |
| 3,983,487 | 9/1976 | Ohno | 325/315 |
| 4,001,729 | 1/1977 | Weinberger | 332/1 |
| 4,112,377 | 9/1978 | Tanner | 325/461 |
| 4,266,295 | 5/1981 | Bach, Jr. | 455/173.1 |
| 4,490,837 | 12/1984 | Buchwald | 381/15 |
| 5,068,918 | 11/1991 | Verheijen et al. | 455/142 |

Primary Examiner—Nguyen Vo

[57] ABSTRACT

A shortwave amplitude modulated broadcast converter having an antenna electrically connected to an output. The antenna functions to collect shortwave electromagnetic energy. Invention further includes a preselector having an input and an output. The preselector is electrically connected to an input to the antenna at an output and functions to filter unwanted noise from the antenna signal. A mixer having at least one input and an output is electrically connected to the preselector output at an input. The mixer functions to combine the filtered antenna signal and a band select signal to an output. A variable frequency oscillator having an output is electrically connected to a mixer input. The variable frequency oscillator frictions to provide a mixing frequency to the mixer. An output amplifier, having an input and an output, is electrically connected to the mixer and an input, where the output amplifier functions to amplify the combined antenna and variable frequency oscillator signals. The combined antenna and variable frequency oscillator signals are output to a radio receiver, i.e. AM or FM. A power source may be selected from the group consisting of batteries, rechargeable batteries, solar, capacitive, and electro-mechanical to provide an electrical voltage to the components.

7 Claims, 4 Drawing Sheets

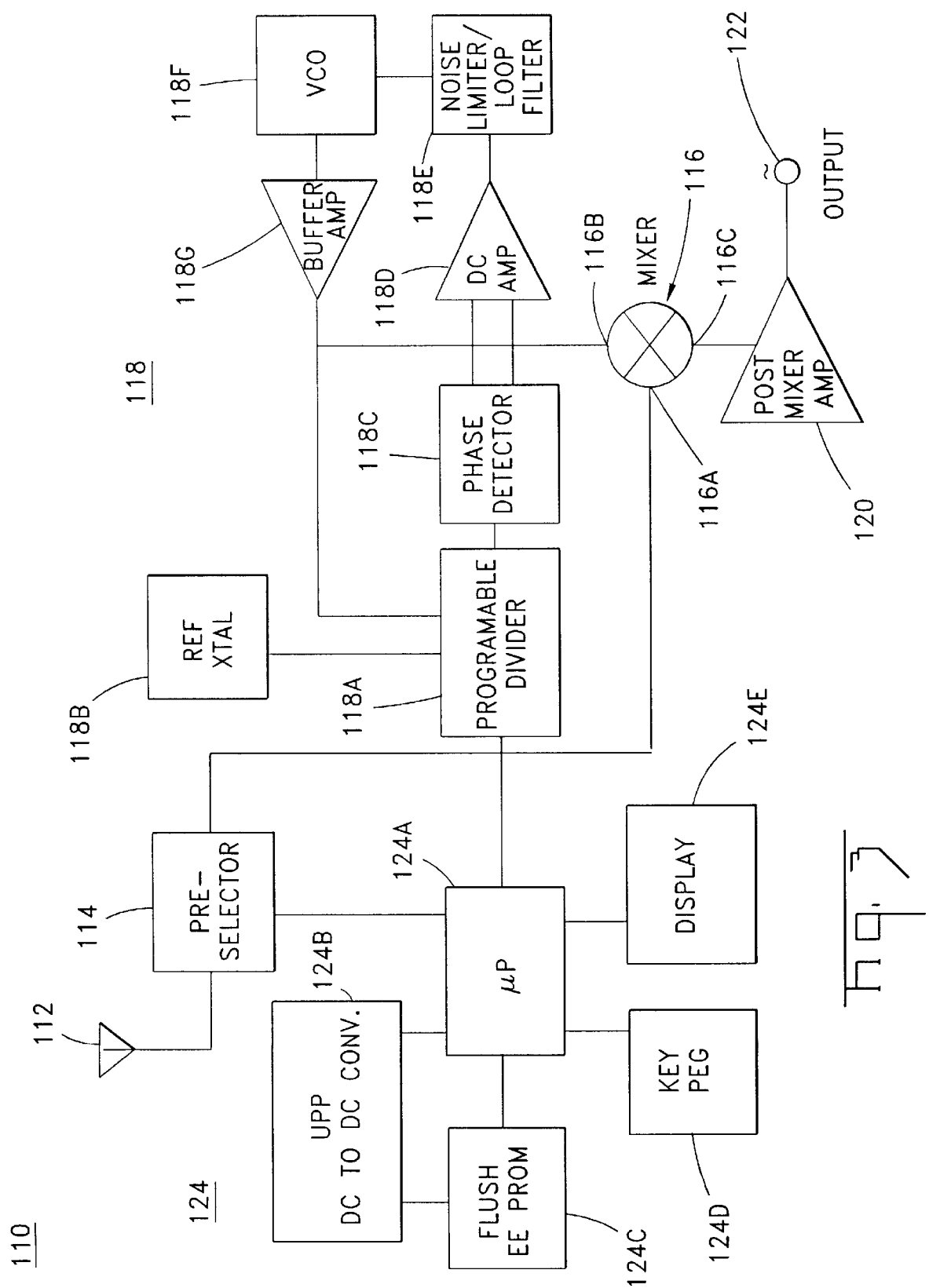

| | |
|---|---|
| 212 | CONNECTING A (212) SHORTWAVE MODULATED BROADCAST CONVERTER (10) TO AN AM BAND RECEIVER, |
| 214 | RECEIVING (214) A SIGNAL WITH AN ANTENNA, |
| 216 | FILTERING (216) NOISE FROM THE RECEIVED SIGNAL, |
| 218 | SELECTING (218) FREQUENCY ON AN AM RADIO, |
| 220 | SECOND SELECTING (220) SHORTWAVE BAND, |
| 222 | MIXING (222) THE SIGNAL WITH A VARIABLE FREQUENCY OSCILLATOR, |
| 224 | OUTPUTTING (224) A SIGNAL FROM A MIXER, |
| 226 | AMPLIFYING (226) AN OUTPUT SIGNAL TO THE AM BAND RADIO RECEIVER, AND |
| 228 | SECOND RECEIVING (228) CONVERTED SHORTWAVE SIGNAL BY AN AM BAND RADIO RECEIVER. |

Fig. 4

SHORTWAVE BROADCAST CONVERTER

BACKGROUND OF THE INVENTION

1. Field of the Invention

The present invention relates to conversion of frequencies. More particularly, the present invention relates to converting and coupling shortwave radio signals to a standard AM radio.

2. Description of the Prior Art

It has been known in the art to convert a shortwave signal into an aM signal for reception on a standard AM radio. The typically this requires a converter to be connected to the antenna or input of the AM radio. The converter is electrically connected to a shortwave antenna on an input end and an antenna or input of the AM radio on the output end. The converter changes the received signals in the shortwave bands into AM signals which are received by the AM radio. A significant drawback to this arrangement is that the AM radio tuner is used to select the frequency of the desired shortwave signal. However, the scale of the tuning dial on the AM radio is matched to AM frequencies. Thus the user cannot tune to a preselected frequency easily. There is a need for a converter which permits the user to select an aM frequency, free from interference, to which the incoming shortwave frequencies are changed. Further the converter needs to have the capability to tune to selected shortwave frequencies.

Numerous innovations for Shortwave A. M. Broadcast Converter have been provided in the prior art that are described as follows. Even though these innovations may be suitable for the specific individual purposes to which they address, they differ from the present invention as hereinafter contrasted.

In U.S. Pat. No. 4,490,837, titled AM Stereo to FM Stereo Converter, invented by Gregory J. Buchwald, a converter is coupled between the antennan and the RF stage of an FM stereophonic receiver to convert received AM stereo signals into FM stereo signals, and decoded into two stereo signals. These signals are ten encoded into a broadcast-type FM stereophonic signal which is coupled into the front end of an FM stereo receiver.

In U.S. Pat. No. 4,112,377, titled C. B. Converter, invented by James L. Tanner and Bruno A. Rist a converter is disclosed for converting 23-channel citizens band to provide citizens band reception through a standard radio, preferably an automotive radio. The circuit is comprised of an RF amplifier and self-oscillating converter which is switched into the antenna connections of an automobile radio. Conventional auto antenna connectors facilitate easy installation. A push-button switch connects the citizens band converter into the line connecting the antenna with the radio. The pish-button switch also grounds the converter output when switched to standard radio to prevent interference with standard radio reception.

In U.S. Pat. No. 4,001,729, titled FM to AM Converter, invented by Howard L. Weinberger, an FM to AM converter which utilizes a source of unmodulated radio frequency energy, two mixers, and a filter to convert an FM signal to an AM signal. The incoming FM signal is mixed with the unmodulated RF energy. The mixed signal is then passed through a filter to generate AM on the mixed signal together with the FM. The amplitude modulated mixed signal is then mixed with the original FM signal to trip off the FM from the amplitude modulated mixed signal thereby generating an AM signal.

In U.S. Pat. No. 3,983,487, titled FM-AM Converter, invented by Masaharu Ohno, an FM-AM converter in which the FM signal is applied to a slope filter in a transmission system. The resulting amplitude modulated FM signal is applied to a circuit that delivers a control signal corresponding to the mean value of the amplitude modulated FM signal and uses this control signal to control either the gain of the FM signal applied to the slope filter or the frequency response of the slope filter so that the amplitude of the amplitude modulated FM signal will have a predetermined mean value.

Numerous innovations for Shortwave A. M. Broadcast Converter have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a shortwave to AM broadcast band converter based on the basic superheterodyne principle of radio receivers. It is an object of the present invention to provide means to convert the transmission of signals through an shortwave converter such that the output is received at a preselected AM radio frequency. It is a further object of the present invention to provide a tuning means in the converter functioning to adjust the shortwave frequency. The present invention resides in an analog embodiment and a digital embodiment.

The types of problems encountered in the prior art are the AM radio tuning scale does not show the true shortwave frequency selected.

In the prior art, unsuccessful attempts to solve this problem were attempted namely: converters which use the AM radio tuner to select the shortwave frequencies and a conversion chart to indicate the actual frequency selected. However, the problem was solved by the present invention because the AM radio frequency is fixed while the actual selection of shortwave frequency is accomplished in the converter.

The present invention solved a long felt need to select shortwave frequencies at the converter while permitting the AM radio to operate in a noise free region of the AM radio band.

Accordingly, it is an object of the present invention to provide conversion of shortwave frequencies to AM radio frequencies.

More particularly, it is an object of the present invention to provide tuning mean in a converter connected to a shortwave antenna and an input to an aM radio.

In keeping with these objects, and with others which will become apparent hereinafter, one feature of the present invention resides, briefly stated, in a preselector (14) which function to receive signals from a shortwave antenna, filter excess noise and output a clean shortwave frequency.

In accordance with another feature of the present invention, a mixer combines the signal from the preselector with an input from a variable frequency oscillator to out put a desired AM signal.

Another feature of the present invention is that variable frequency oscillator (18) is adapted to select desired shortwave bands.

Yet another feature of the present invention is that an output amplifier increases the signal strength from the mixer and adapts the signal to AM radio frequencies.

Still another feature of the present invention is that the converter has a power source selected from batteries, solar power or electro-mechanical power.

Yet still another feature of the present invention is that it has an analog embodiment.

Still yet another feature of the present invention is that it had a digital embodiment.

Another feature of the present invention is that the user may tune the converter to the desired shortwave frequency while the AM radio remains on a clear AM frequency. This results in clear noise free reception.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing(s).

BRIEF LIST OF REFERENCE NUMERALS UTILIZED IN THE DRAWING

10—shortwave amplitude modulated broadcast converter (10)
12—antenna (12)
14—preselector (14)
14A—preselector capacitor C1 (14A)
14B—preselector inductor L1 (14B)
14C—preselector capacitor C4 (14C)
14D—preselector inductor L2 (14D)
14E—preselector switch SW1 (14E)
14F—preselector capacitor C5 (14F)
14G—preselector switch SW2 (14G)
14H—preselector capacitor C2 (14H)
14I—preselector inductor L3 (14I)
14J—preselector switch SW3 (14J)
14K—preselector inductor L4 (14K)
14L—preselector capacitor C6 (14L)
14M—preselector switch SW4 (14M)
14N—preselector capacitor C3 (14N)
16—mixer (16)
16A—mixer input (16A)
16B—mixer resistor R3 16B)
16D—mixer resistor R4 (16D)
16E—mixer transistor Q2 (16E)
16F—mixer diode D2 (16F)
16G—mixer resistor R5 (16G)
16H—mixer inductor L6 (16H)
18—variable frequency oscillator (18)
18A—variable frequency oscillator capacitor C18 (18A)
18B—variable frequency oscillator junction (18B)
18C—variable frequency oscillator transistor Q1 (18C)
18D—variable frequency oscillator resistor R1 (18D)
18E—variable frequency oscillator diode D1 (18E)
18F—variable frequency oscillator resistor R2 (18F)
18G—variable frequency oscillator variable inductor L5 (18G)
18H—variable frequency oscillator capacitor C11 (18H)
18I—variable capacitor C7 (18I)
18J—variable frequency oscillator capacitor C8 (18J)
18K—variable frequency oscillator capacitor C9 (18K)
18L—variable frequency oscillator capacitor C10 (18L)
18M—variable frequency oscillator capacitor C12 (18M)
18N—variable frequency oscillator capacitor C13 (18N)
18O—variable frequency oscillator capacitor C14 (18O)
18P—variable frequency oscillator capacitor C15 (18P)
18Q—variable frequency oscillator capacitor C16 (18Q)
18R—variable frequency oscillator capacitor C17 (18R)
18S—variable frequency oscillator switch SW5 (18S)
18SA—variable frequency oscillator switch t amplifier resistor R8 (20J)
20K—output amplifier capacitor C24 (20K)
20L—output amplifier inductor L8 (20L)
20M—output amplifier capacitor C22 (20M)
20N—output amplifier capacitor C23 (20N)
22—output (22)
24—power source (24)
26—electrical ground (26)
110—second digital shortwave amplitude modulated broadcast converter (110)
112—second antenna (112)
114—second preselector (114)
116—second mixer (116)
116A—second mixer first input (116A)
116B—second mixer second input (116B)
116C—second mixer output (116C)
118—second voltage controlled oscillator (118)
118A—second voltage controlled oscillator programmable divider (118A)
118B—second voltage controlled oscillator reference frequency (118B)
118C—second voltage controlled oscillator phase detector (118C)
118D—second voltage controlled oscillator DC amplifier (118D)
118E—second voltage controlled oscillator noise limiter loop filter (118E)
118F—second voltage controlled oscillator voltage controller oscillator (118F)
118G—second voltage controlled oscillator buffer amplifier (118G)
120—second output amplifier (120)
122—second output (122)
124—second digital tuner (124)
124A—second digital tuner microprocessor (124A)
124B—second digital tuner DC/DC converter flash prom (124B)
124C—second digital tuner flash prom (124C)
124D—second digital tuner key plug (124D)
124E—second digital tuner display (124E)
126—power source (126)
210—a method of converting a shortwave signal to an amplitude modulated frequency on the AM radio band (210)
212—connecting a (212) shortwave amplitude modulated broadcast converter (10) to an AM band radio receiver
214—receiving (214) a signal with an antenna
216—filtering (216) noise from the received signal
218—selecting (218) frequency on an aM radio
220—second selecting (220) shortwave band
222—mixing (222) the signal with a variable frequency oscillator
224—outputting (224) a signal from a mixer
226—amplifying (226) an output signal to the AM band radio receiver
228—second receiving (228) converted shortwave signal by an aM band radio receiver

BRIEF DESCRIPTION OF THE PREFERRED EMBODIMENT

FIG. 3 is a block diagram of a second digital shortwave amplitude modulated broadcast converter.

FIG. 4 is a method of converting a shortwave signal to an amplitude modulated frequency on the AM radio band.

DETAILED DESCRIPTION OF THE PREFERRED EMBODIMENT

Figure 1:
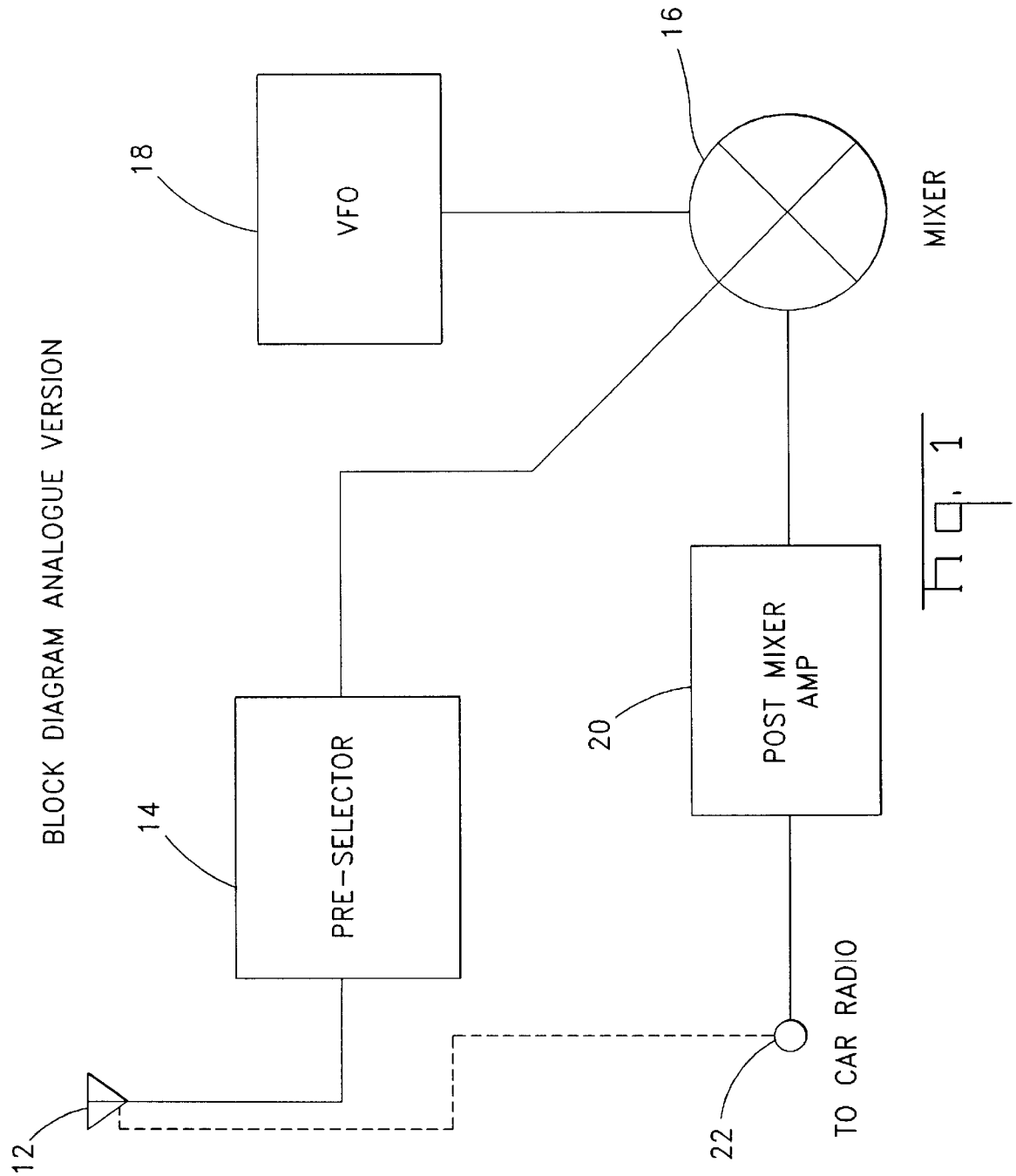
FIG. 1 is a block diagram of a shortwave amplitude modulated broadcast converter

Firstly, referring to FIG. 1 which is a block diagram of a shortwave amplitude modulated broadcast converter (10) which comprises an antenna (12) having an output. The antenna (12) functions to collect short wave electromagnetic energy, the antenna (12) changes the collected short wave electromagnetic energy into electrical voltages and outputs a voltage.

A preselector (14) having an input and an output is electrically connected at an input to the to the antenna (12). The preselector (14) functions to filter unwanted noise from the antenna (12) signal.

A mixer (16) having at least one input and an output is electrically connected to the preselector (14) output at an input. The mixer (16) functions to combine the filtered antenna signal and a band select signal to an output.

A variable frequency oscillator (18) having an output is electrically connected to a mixer (16) input, the variable frequency oscillator (18) functions to provide a mixing frequency to the mixer (16).

An output amplifier (20) having an input and an output is electrically connected to the mixer (16) at an input. The output amplifier (20) functions to amplify the combined antennan and variable frequency oscillator signals. The combined antenna and variable frequency oscillator signals are output to an aM radio receiver.

Figure 2:
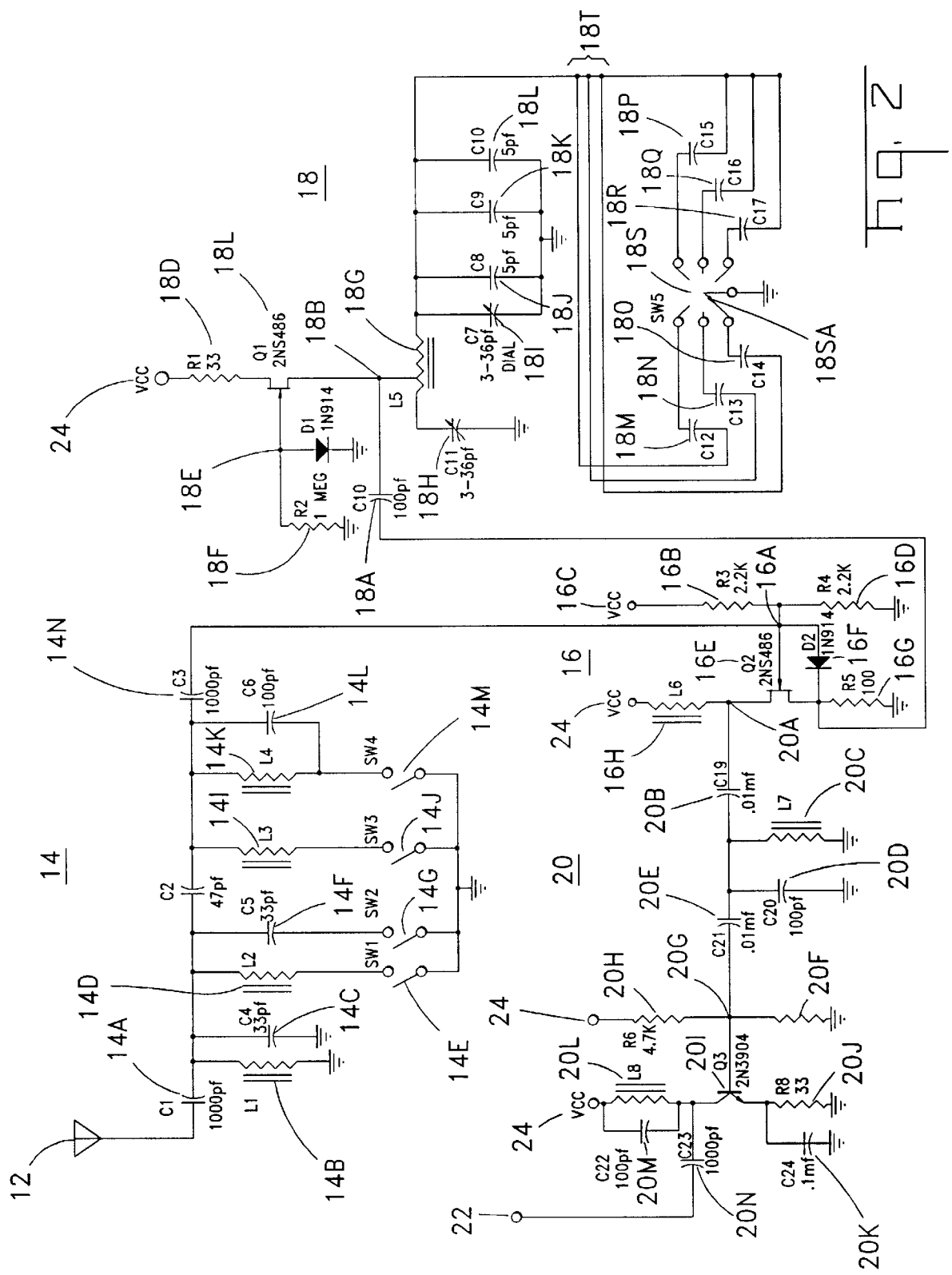
FIG. 2 is a schematic of a shortwave amplitude modulated broadcast converter

A power source (24) is selected from a group consisting of, batteries, rechargeable batteries, solar, capacitive, AC, DC and electro-mechanical. The power source (24) function to provides voltage to the electrical components Secondly referring to FIG. 2 which is a schematic of a shortwave amplitude modulated broadcast converter (10) which comprises a preselector (14) having an input and an output. The preselector (14) is electrically connected at an input to the antenna (12). The preselector (14) functions to filter unwanted noise from the antenna (12) signal. The preselector (14) comprises a preselector capacitor C1 (14A) electrically connected at one distal end to the antenna (12). The preselector capacitor C1 (14A) functions to decouple the incoming signal from the antenna (12). An opposite distal end is electrically connected to one end of a preselector inductor L1 (14B). An opposite end of the preselector inductor L1 (14B) is electrically connected to an electrical ground (26). The preselector capacitor C1 (14A) is further connected to a preselector capacitor C4 (14C). An opposite end of the preselector capacitor C4 (14C) is electrically connected to an electrical ground (26). The preselector inductor L1 (14B) and preselector capacitor C4 (14C) functions to band pass filter the short wave portion of the in coming signal from the antenna (12). The preselector capacitor C1 (14A) is further connected to one distal end of a preselector inductor L2 (14D). An opposite distal end of the preselector inductor L2 (14D) is electrically connected to a contact of a preselector switch SW1 (14E) the wiper of the preselector switch SW1 (14E) is electrically connected to the electrical ground (26). When preselector switch SW1 (14E) is closed the preselector inductor L2 (14D) functions in conjunction with the preselector inductor L1 (14B) and preselector capacitor C4 (14C) to filter noise. The preselector capacitor C1 (14A) is further connected to one distal end of a preselector capacitor C5 (14F). An opposite distal end of the preselector capacitor C5 (14F) is electrically connected to a contact of a preselector switch SW2 (14G). The wiper of the preselector switch SW2 (14G) is electrically connected to the electrical ground (26). When the preselector switch SW2 (14G) is closed the preselector capacitor C5 (14F) functions in conjunction with the preselector inductor L1 (14B) and preselector capacitor C4 (14C) to filter noise. The preselector capacitor C1 (14A) is further connected to one distal end of a preselector capacitor C2 (14H). An opposite distal end of the preselector capacitor C2 (14H) is electrically connected to a preselector inductor L3 (14I). An opposite distal end of the preselector inductor L3 (14I)is electrically connected to a contact of a preselector switch SW3 (14J). The wiper of the preselector switch SW3 (14J) is electrically connected to the electrical ground (26), when the preselector switch SW3 (14J) is closed the preselector inductor L3 (14I) functions in conjunction with the preselector inductor L1 (14B), preselector capacitor C2 (14H) and preselector capacitor C4 (14C) to filter noise. The preselector capacitor C2 (14H) is further connected to one distal end of a preselector inductor L4 (14K). An opposite distal end of the preselector inductor L4 (14K) is electrically connected to a preselector switch SW4 (14M) and negative electrical end of a capacitor C6 (14L). The preselector capacitor C2 (14H) is further connected to a positive electrical end of the preselector capacitor C6 (14L). An opposite negative electrical end of the preselector capacitor C6 (14L) is electrically connected to a contact of a preselector switch SW4 (14M). The wiper of the preselector switch SW4 (14M) is electrically connected to the electrical ground (26). When the preselector switch SW4 (14M) is closed the preselector inductor L4 (14K) and the preselector capacitor C6 (14L) function in conjunction with the preselector inductor L1 (14B), preselector capacitor C2 (14H) and preselector capacitor C4 (14C) to filter noise. The preselector capacitor C2 (14H) is farther connected to positive electrical end of a preselector capacitor C3 (14N) having a negative electrical end.

The shortwave amplitude modulated broadcast converter (10) further comprises a mixer (16) having at least one input and an output. The mixer (16) is electrically connected to the preselector (14) output. The mixer (16) functions to combine the filtered antenna signal and a band select signal. The mixer (16) comprises a mixer input (16A) which is electricaly connected to the negative electrical end of the preselector capacitor C3 (14N). The mixer input (16A) is further connected to one distal end of a mixer resistor R3 (16B). An opposite distal end of the mixer resistor R3 (16B) is electrically connected to a power source (24). The mixer input (16A) is further connected to one distal end of a mixer resistor R4 (16D). An opposite distal end of the mixer resistor R4 (16D) is electrically connected to the electrical ground (26). The mixer input (16A) is further connected to a base of a mixer transistor Q2 (16E). The mixer input (16A) is further connected to positive electrical end of a mixer diode D2 (16F). The negative electrical end of the mixer diode D2 (16F) is electrically connected to one distal end of a mixer resistor R5 (16G) and negative electrical end of the mixer transistor Q2 (16E). An opposite distal end of the mixer resistor R5 (16G) is electrically connected to the electrical ground (26), a positive electrical end of the mixer transistor Q2 (16E) is electrically connected to one distal end of a mixer inductor L6 (16H) an opposite distal end of the mixer inductor L6 (16H) is electrically connected to the power source (24).

The shortwave amplitude modulated broadcast converter (10) further comprises a variable frequency oscillator (18)

having an output. The is variable frequency oscillator (18) connected to a mixer (16) input. The variable frequency oscillator (18) functions to provide a mixing frequency to the mixer (16). The variable frequency oscillator (18) comprises a variable frequency oscillator capacitor C18 (18A) which is electrically connected to the negative electrical end of the mixer diode D2 (16F) on the positive electrical end and to a variable frequency oscillator junction (18B) on the negative electrical end.

The variable frequency oscillator junction (18B) is further connected to the negative electrical end of a variable frequency oscillator transistor Q1 (18C). The positive electrical end of the variable frequency oscillator transistor Q1 (18C) is electrically connected to one distal end of a variable frequency oscillator resistor R1 (18D). An opposite distal end of the variable frequency oscillator resistor R1 (18D) is electrically connected to the power source (24). The base of the variable frequency oscillator transistor Q1 (18C) is electrically connected to a positive electrical end of a variable frequency oscillator diode D1 (18E). The negative electrical end of the variable frequency oscillator diode D1 (18E) is electrically connected to the electrical ground (26). The base of the variable frequency oscillator transistor Q1 (18C) is further connected to one distal end of a variable frequency oscillator resistor R2 (18F). An opposite distal end of the variable frequency oscillator resistor R2 (18F) is electrically connected to electrical ground (26).

The variable frequency oscillator junction (18B) is further connected to the tap of a variable frequency oscillator variable inductor L5 (18G). One distal end of the variable frequency oscillator variable inductor L5 (18G) is electrically connected to a positive electrical end of a variable frequency oscillator capacitor C11 (18H). The negative distal end of the variable frequency oscillator capacitor C11 (18H) is electrically connected to electrical ground (26). An opposite distal end of the variable frequency oscillator variable inductor L5 (18G) is electrically connected to a variable capacitor C7 (18I). An opposite distal end of the variable capacitor C7 (18I) is electrically connected to electrical ground (26). An opposite distal end of the variable frequency oscillator variable inductor L5 (18G) is further connected to a positive electrical end of a variable frequency oscillator capacitor C8 (18J). An opposite distal end of the variable frequency oscillator capacitor C8 (18J) is electrically connected to electrical ground (26). An opposite distal end of the variable frequency oscillator variable inductor L5 (18G) is further connected to a positive electrical end of a variable frequency oscillator capacitor C9 (18K). An opposite distal end of the variable frequency oscillator capacitor C9 (18K) is electrically connected to electrical ground (26). An opposite distal end of the variable frequency oscillator variable inductor L5 (18G) is further connected to a positive electrical end of a variable frequency oscillator capacitor C10 (18L). An opposite distal end of the variable frequency oscillator capacitor C10 (18L) is electrically connected to electrical ground (26). An opposite distal end of the variable frequency oscillator variable inductor L5 (18G) is further connected to a variable frequency oscillator junction (18T).

The variable frequency oscillator junction (18T) is electrically connected to a positive distal end of a capacitor selected from the group consisting of a variable frequency oscillator capacitor C12 (18M), a variable frequency oscillator capacitor C13 (18N), a variable frequency oscillator capacitor C14 (18O), a variable frequency oscillator capacitor C15 (18P), a variable frequency oscillator capacitor C16 (18Q), and a variable frequency oscillator capacitor C17 (18R). The negative distal end of the capacitors selected from a group consisting of variable frequency oscillator capacitor C12 (18M), a variable frequency oscillator capacitor C13 (18N), a variable frequency oscillator capacitor C14 (18O), a variable frequency oscillator capacitor C15 (18P), a variable frequency oscillator capacitor C16 (18Q), and a variable frequency oscillator capacitor C17 (18R) are connected to respective contacts of a variable frequency oscillator switch SW5 (18S). One distal end of a variable frequency oscillator switch wiper (18SA) is electrically connected to the electrical ground (26). An opposite distal end of variable frequency oscillator switch wiper (18SA) is selectably connected to a capacitor selected from the group consisting of a variable frequency oscillator capacitor C12 (18M), a variable frequency oscillator capacitor C13 (18N), a variable frequency oscillator capacitor C14 (18O), a variable frequency oscillator capacitor C15 (18P), a variable frequency oscillator capacitor C16 (18Q), and a variable frequency oscillator capacitor C17 (18R).

The shortwave amplitude modulated broadcast converter (10) further comprises an output amplifier (20) having an input and an output. The output amplifier (20) is electrically connected to the mixer (16) at an input. The output amplifier (20) functions to amplify the combined antenna and variable frequency oscillator signals. The combined antenna and variable frequency oscillator signals are output to an aM radio receiver. The output amplifier (20) comprises an output amplifier input (20A) which is electrically connected to the positive electrical end of the mixer transistor Q2 (16E). The output amplifier input (20A) is electrically connected to positive electrical end of an output amplifier capacitor C19 (20B). A negative electrical end of the output amplifier capacitor C19 (20B) is electrically connected to one distal end of an output amplifier inductor L7 (20C). An opposite distal end of the output amplifier inductor L7 (20C) is electrically connected to electrical ground (26). The negative electrical end of the output ampl output amplifier junction (20G). The output amplifier junction (20G) is further connected to one distal end of an output amplifier resistor R7 (20F) and an output amplifier resistor R6 (20H). An opposite distal end of the output amplifier resistor R7 (20F) is electrically connected to electrical ground (26). An opposite distal end of output amplifier resistor R6 (20H) is electrically connected to the power source (24). The output amplifier junction (20G) is further connected to a base of an output amplifier transistor Q3 (20I). The emitter of the output amplifier transistor Q3 (20I) is electrically connected to one distal end of an output amplifier resistor R8 (20J) and an output amplifier capacitor C24 (20K). The opposite distal ends of the output amplifier resistor R8 (20J) and the output amplifier capacitor C24 (20K) are connected to electrical ground (26). The collector of the output amplifier transistor Q3 (20I) is electrically connected to one distal end of an output amplifier inductor L8 (20L), an output amplifier capacitor C22 (20M), and an output amplifier capacitor C23 (20N). An opposite distal end of output amplifier inductor L8 (20L) is electrically connected to the power source (24). An opposite distal end of the output amplifier capacitor C22 (20M) is electrically connected to the power source (24). An opposite distal end of the output amplifier capacitor C22 (20M) is electrically connected to the power source (24). An opposite distal end of the output amplifier capacitor C23 (20N) is electrically connected to an output (22). The output (22) is electricaly connected to the antenna of an amplitude modulated radio.

The shortwave amplitude modulated broadcast converter (10) further comprises an output (22) which is electricaly connected to the antenna of a frequency modulated radio.

Thirdly, referring to FIG. 3 which is a block diagram of a second digital shortwave amplitude modulated broadcast converter (110). A second digital shortwave amplitude modulated broadcast converter (110) comprises a second antenna (112) having an output. The second antenna (112) functions to collect short wave electromagnetic energy. The second antenna (112) changes the collected short wave electromagnetic energy into electrical voltages and outputs a voltage.

The second digital shortwave amplitude modulated broadcast converter (110) further comprises a second preselector (114) having an input and an output. The second preselector (114) is electrically connected at an input to the to the second antenna (112) at an output. The second preselector (114) functions to filter unwanted noise from the second antenna (112) signal.

The second digital shortwave amplitude modulated broadcast converter (110) further comprises a second mixer (116) having a second mixer first input (116A), a second mixer second input (116B) and a second mixer output (116C). The second mixer (116) is electrically connected to the second preselector (114) output at the second mixer first input (116A). The second mixer (116) functions to combine the filtered antenna signal and a band select signal then output the combine the filtered antenna signal and the band select signal at the second mixer output (116C).

The second digital shortwave amplitude modulated broadcast converter (110) further comprises a second voltage controlled oscillator (118) having an output is electrically connected to a second mixer second input (116B). The second voltage controlled oscillator (118) functions to provide a mixing frequency to the second mixer second input ( 16B). The second voltage controlled oscillator (118) comprises a second voltage controlled oscillator programmable divider (118A) which receives a command from a second digital tuner microprocessor (124A). The command from the second digital tuner microprocessor (124A) functions to set the second voltage controlled oscillator programmable divider (118A) to a value which is compared to the frequency of a second voltage controlled oscillator reference frequency (118B). The resultant signal is output to a second voltage controlled oscillator phase detector (118C). The second voltage controlled oscillator phase detector (118C) is electrically connected to a second voltage controlled oscillator DC amplifier (118D), which functions to amplify a phase detected signal. The amplified signal from the second voltage controlled oscillator DC amplifier (118D) is processed by a second voltage controlled oscillator noise limiter loop filter (118E) which reduces the noise in the signal. The second voltage controlled oscillator noise limiter loop filter (118E) second voltage controlled oscillator noise limiter loop filter (118E) is electrically connected to a second voltage controlled oscillator voltage controller oscillator (118F) having a frequency input and a voltage output. The second voltage controlled oscillator voltage controller oscillator (118F) changes the voltage received from the second voltage controlled oscillator noise limiter loop filter (118E) into a frequency proportional to the input voltage. The second voltage controlled oscillator voltage controller oscillator (118F) is electrically connected to a second voltage controlled oscillator buffer amplifier (118G). The second voltage controlled oscillator buffer amplifier (118G) functions to buffer the signal from the second voltage controlled oscillator voltage controller oscillator (118F), second voltage controlled oscillator buffer amplifier (118G) is electrically connected to the second mixer (116).

The second digital shortwave amplitude modulated broadcast converter (110) further comprises a second output amplifier (120) having an input and an output is electrically connected to the second mixer (116) at an input. The second output amplifier (120) functions to amplify the combined antenna and variable frequency oscillator signals. The combined antenna and variable frequency oscillator signals are output via a second output (122) to an aM radio receiver.

The second digital shortwave amplitude modulated broadcast converter (110) further comprises a second digital tuner (124) connected to the second preselector (114). The second digital tuner (124) functions to digitally select filtering of the incoming signal and send commands to the second voltage controlled oscillator (118) resulting is a selection of an user desired frequency.

The second digital tuner (124) comprises a second digital tuner microprocessor (124A) having an output to the second preselector (114), and to the second voltage controlled oscillator programmable divider (118A). The second digital tuner microprocessor (124A) is further connected to a second digital tuner DC/DC converter flash prom (124B). The second digital tuner DC/DC converter flash prom (124B) functions to store preselected values when the power source (126) is removed. The second digital tuner microprocessor (124A) is further connected to a second digital tuner flash prom (124C). The second digital tuner flash prom (124C) functions to store channel and frequency values for recall by the second digital tuner microprocessor (124A). The second digital tuner microprocessor (124A) is further connected to a second digital tuner key plug (124D). The second digital tuner microprocessor (124A) is further connected to a second digital tuner display (124E). The second digital tuner display (124E), functions to display parameters selected from the group consisting of, frequency selected, filtering selected, signal strength, band selected, condition of the power source (126).

The second digital shortwave amplitude modulated broadcast converter (110) further comprises a power source (126) selected from a group consisting of, batteries, rechargeable batteries, solar, capacitive, AC, DC and electro-mechanical.

Finally, referring to FIG. 4 is a method of converting a shortwave signal to an amplitude modulated frequency on the AM radio band (210) which comprises the steps of:

A) connecting (212) electrically a shortwave amplitude modulated broadcast converter (10) to an AM band radio receiver, B) first receiving (214) an input signal with an antenna, C) filtering (216) noise from the received input signal, D) first selecting (218) frequency on an AM radio, E) second selecting (220) a shortwave band, F) mixing (222) the received input signal with a variable frequency oscillator, G) outputting (224) an output signal from a mixer, H) amplifying (226) the output signal to the AM band radio receiver, and I) second receiving (228) converted shortwave signal by an aM band radio receiver.

It will be understood that each of the elements described above, or two or more together, may also find an useful application in other types of constructions differing from the type described above.

While the invention has been illustrated and described as embodied in a Shortwave A. M. Broadcast Converter, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shortwave amplitude modulated broadcast converter comprising:
   a.) an antenna having an output, the antenna functioning to collect shortwave electromagnetic energy;
   b.) a preselector having an input connected to an output of said antenna, the preselector functioning to filter unwanted noise from the antenna signal, said preselector comprising a capacitor C1 electrically connected at one distal end to said antenna, the capacitor C1 functioning to decouple the incoming signal from said antenna, where an opposite distal end is electrically connected to one end of an inductor L1, an opposite end of the inductor L1 being electrically connected to an electrical ground, the capacitor C1 being further electrically connected to a capacitor C4, where an opposite end of the capacitor C4 is electrically connected to an electrical ground, the inductor L1 and capacitor C4 functioning to band pass filter the shortwave portion of the incoming signal from said antenna, the capacitor C1 being further electrically connected to one distal end of an inductor L2, where an opposite distal end of the inductor L2 is electrically connected to a contact of a switch SW1, further having a wiper electrically connected to the electrical ground which said switch is closed, the inductor L2 functioning in conjunction with the inductor L1 and capacitor C4 to filter noise, the capacitor C1 being further electrically connected to one distal end of a capacitor C5, where an opposite distal end of the capacitor C5 is electrically connected to a contact of a switch SW2, further having a wiper electrically connected to the electrical ground when the switch SW2 is closed, the capacitor C5 functioning with the inductor L1 and capacitor C4 to filter noise, the capacitor C1 being further electrically connected to the distal end of capacitor C2, and opposite distal end of the capacitor C2 being electrically connected to an inductor L3, where an opposite distal end of inductor L3 is electrically connected to a contact of switch SW3, further having a wiper electrically connected to the electrical ground when the switch SW3 is closed, the inductor L3 functioning in conjunction with inductor L1, capacitor C2, and capacitor C4 to filter noise, the capacitor C2 being further connected to one distal end of inductor L4, where an opposite distal end of the inductor L4 is electrically connected to a switch SW4 and negative electrical end of a capacitor C6, the capacitor C2 being further electrically connected to a positive electrical end of capacitor C6, where an opposite negative electrical end of capacitor C6 is electrically connected to a contact of the switch SW4, further having a wiper electrically connected to the electrical ground when the switch SW4 is closed, a capacitor C3 having a positive end connected to a negative end of the capacitor C2 and electrically connected to a power source, the inductor L4 and capacitor C6 functioning in conjunction with the inductor L1, the capacitor C3, and the capacitor C4 to filter noise;

c.) a mixer having at least one input and at least one output, the at least one input being electrically connected to said preselector, said mixer functioning to combine the filtered antenna signal and a band select signal to transmit a combined signal at the output of said mixer, where said mixer input is further electrically connected to one distal end of a resistor R4, and an opposite end of said resistor R4 is electrically connected to the electrical ground, and the mixer input is further electrically connected to the base of a transistor Q2, where said mixer input is further electrically connected to a positive electrical end of a diode D2, the negative electrical end of said diode D2 being electrically connected to one distal end of a resistor R5 and a negative electrical end of said transistor Q2, where an opposite distal end of said resistor R5 is electrically connected to the electrical ground, a positive electrical end of said transistor Q2 being electrically connected to one end of an inductor L6, and an opposite distal end of said inductor L6 being electrically connected to the power source;
   d.) a variable frequency oscillator having an output electrically connected to the input of said mixer, the oscillator functioning to provide a mixing frequency to said mixer;
   e.) an output amplifier having an input and an output which are electrically connected to the output of said mixer, said amplifier functioning to amplify the combined antenna and variable frequency oscillator signals, where the combined signals are transmitted to an output of a radio receiver; and
   f.) the power source electrically connected to said preselector, said mixer, said oscillator, and said amplifier, where the power source is selected from the group consisting of batteries, rechargeable batteries, solar, capacitive, AC, DC, and electro-mechanical.

2. The shortwave amplitude modulated converter as claimed in claim 1, wherein the oscillator further comprises a capacitor C18 electrically connected to the negative electrical end of the diode D2 and to an oscillator junction, said oscillator junction being further electrically connected to the negative end of a transistor Q1, the positive electrical end of said transitor Q1 being electrically connected to one distal end of a resistor R1, an opposite distal end of said resistor R1 being electrically connected to said power source, where the base of said transistor Q1 is electrically connected to the positive electrical end of a diode D1, the negative electrical end of said diode D1 being electrically connected to said electrical ground, where said base of transistor Q1 is further electrically to one distal end of said resistor R2, and opposite distal end of said resistor R2 being electrically connected to said electrical ground, said oscillator junction being further electrically connected to a tap of an inductor L5, the one distal end of said inductor L5 being electrically connected to a positive electrical end of a capacitor C11, the negative distal end of said capacitor C11 being electrically connected to said electrical ground, the opposite distal end of said inductor L5 being electrically connected to a variable capacitor C7, the opposite distal end of said capacitor C7 being electrically connected to said electrical ground, where the opposite distal end of said inductor L5 is further electrically connected to a positive electrical end of a capacitor C8 the opposite distal end of said capacitor C8 being electrically connected to said electrical ground, the opposite distal end of said inductor L5 being further electrically connected to a positive electrical end of a capacitor C9, the opposite end of said capacitor C9 being electrically connected to said electrical ground, the opposite distal end of said inductor L5 being further connected to a positive electrical end of capacitor C10, the opposite distal end of said capacitor C10 being electrically connected to said electrical ground, the opposite distal end of said inductor L5 is further electrically connected to a variable frequency oscillator junction, said frequency oscillator junction being electrically connected to a negative distal end of a capacitor selected from the capacitors C12–C17, which are electrically connected to a contact of a switch SW5 having a wiper electrical connected to said ground, where an opposite end of said wiper is electrically connected to said capacitors C12–C17.

3. The shortwave amplitude modulated broadcast converter as claimed in claim 1, wherein said output amplifier comprises an input electrically connected to the positive electrical end of said transistor Q2, the input being electrically connected to the positive electrical end of a capacitor C19, where the negative electrical end of said capacitor C19 is electrically connected to one distal end of an inductor L7, an opposite distal end of said inductor L7 being electrically connected to said electrical ground, where the negative electrical end of said capacitor C19 is further electrically connected to one distal end of capacitors C20, C21, where an opposite distal end of sad capacitor C20 is electrically connected to said electrical ground, the negative electrical end of said capacitor C19 being electrically connected to one distal end of said capacitor C21, an opposite distal end of said capacitor C21 being electrically connected to an output amplifier junction, said junction further electrically connected to one distal end of resistors R6, R7, an opposite distal end of said resistor R7 being electrically connected to said electrical ground, where an opposite distal end of said resistor R6 is electrically connected to said power source, said junction is further electrically connected to the base of a transistor Q3, further having an emitter and a collector, said emitter being electrically connected to one distal end of a resistor RS and capacitor C24, the opposite distal ends of said resistor R8 and said capacitor C24 being electrically connected to said electrical ground, where said collector is electrically connected to one distal end of an inductor L8, and capacitors C23, C22, the opposite distal end of said inductor L8 being electrically connected to said power source, where the opposite end of said capacitor C22 is electrically connected to said power source, and the opposite distal end of said capacitor C23 is electrically connected to said output.

4. The shortwave amplitude modulated broadcast converter as claimed in claim 3, wherein said output is electrically connected to an antenna of the radio receiver, and that said radio receiver is an AM band radio receiver.

5. The shortwave amplitude modulated broadcast converter as claimed in claim 3, wherein said output is electrically connected to an antenna of the radio receiver, and that said radio receiver is an FM band radio receiver.

6. A digital shortwave amplitude modulated broadcast converter comprising:

a.) an antenna having an output, the antenna functioning to collect shortwave electro-magnetic energy, said antenna changing the collected shortwave electromagnetic energy into electrical voltages and output a voltage;

b.) a preselector having an input and an output, said input being electrically connected to said output of the antenna, the preselector functioning to filter unwanted noise from the antenna signal;

c.) a mixer having a first input, a second input, and an output, said mixer being electrically connected to said preselector output at said first input, said mixer functioning to combine the filtered antenna signal and a band select signal then output the combination to said output;

d.) a voltage controlled oscillator having an output electrically connected to said second input, said voltage controlled oscillator functioning to provide a mixing frequency to said second input; said voltage controlled oscillator further comprising a voltage controlled programmable divider which receives a command from a digital tuner microprocessor, the command from said microprocessor functioning to set said divider to a value which is compared to the frequency of a voltage controlled oscillator reference frequency, the output signal of the divider is output to a voltage controlled oscillator phase detector, where said phase detector is electrically connected to a DC amplifier, which functions to amplify a phase detected signal, where the amplified signal from said DC amplifier is processed by a limiter loop filter which reduces the noise in the signal, where said noise limiter loop filter is electrically connected to said voltage controlled oscillator having a frequency input and voltage output, where said voltage controlled oscillator changes the voltage received from said limiter loop filter into a frequency proportioned to the input voltage, said voltage controlled oscillator being electrically connected to a buffer amplifier, said buffer amplifier functioning to buffer the signal from said voltage controlled oscillator, where said buffer amplifier is electrically connected to said mixer;

e.) an output amplifier having an input and an output, where the input of the amplifier is electrically connected to the output of said mixer, said output amplifier functioning to amplify the combined antenna and variable frequency oscillator signals, where said signals are output to an AM radio receiver;

f.) a digital tuner electrically connected to said preselector, said digital tuner functioning to digitally select filtering of the incoming signal and send commands to said voltage controlled oscillator resulting in the selection of a user desired frequency; and g.) a power source electrically connected to said preselector, said mixer, said voltage controlled oscillator, and said digital tuner, where said power source is selected from the group consisting of batteries, rechargeable batteries, solar, capacitive, AC, DC, and electro-mechanical.

7. The digital shortwave amplitude modulated broadcast converter as claimed in claim 6, wherein said digital tuner comprises the microprocessor having an output to said preselector, and to said programmable divider, where said microprocessor is further connected to a digital tuner DC/DC converter flash prom, said flash prom functioning to store preselected values when said power source is removed, said microprocessor being further connected to a second digital flash prom, said second flash prom functioning to store channel and frequency values for recall by said microprocessor, said microprocessor being further connected to a digital tuner key plug, where said microprocessor is further connected to a digital tuner display, said digital tuner display functioning to display parameters selected from the group consisting of frequency selected, filtering selected, signal strength, band selected, and condition of said power source.

* * * * *